United States Patent

Kelly

[11] 3,729,666
[45] Apr. 24, 1973

[54] DC COMMAND SMOOTHING CIRCUIT
[75] Inventor: William J. Kelly, Sauquoit, N.Y.
[73] Assignee: Cogar Corporation, Wappingers Falls, N.Y.
[22] Filed: Jan. 8, 1971
[21] Appl. No.: 104,930

[52] U.S. Cl. .................................. 318/458, 318/611
[51] Int. Cl. .............................................. G05b 11/42
[58] Field of Search .................. 318/269, 448, 458, 318/611, 621, 637, 628

[56] References Cited

UNITED STATES PATENTS

| 3,035,795 | 5/1962 | Larson | 318/611 X |
| 3,493,826 | 2/1970 | Wandrey | 318/621 |
| 3,465,276 | 9/1969 | Silva et al. | 318/637 X |
| 3,523,232 | 8/1970 | Hall et al. | 318/611 |

Primary Examiner—Bernard A. Gilheany
Assistant Examiner—W. E. Duncanson, Jr.
Attorney—Gottieb, Rockman & Reisman and Harry M. Weiss

[57] ABSTRACT

A DC command smoothing circuit which converts step inputs to smoothed command outputs. Although different polarity and magnitude outputs can be generated, only a single operational amplifier is required to produce all of the necessary transition functions. The operational amplifier includes a capacitor in parallel with a fixed resistor and at least one pair of series connected resistors. The junction of the series resistors can be selectively shorted to ground to change the gain of the amplifier.

14 Claims, 4 Drawing Figures

Patented April 24, 1973 3,729,666

INVENTOR
WILLIAM J. KELLY
BY Gottlieb, Rackman & Reisman
Harry M Weiss
ATTORNEYS

DC COMMAND SMOOTHING CIRCUIT

This invention relates to DC command smoothing circuits, and more particularly to speed control circuits.

When a DC step command signal is applied to a servo controller, it is often necessary to lengthen the rise time of the output signal. This smoothing action prevents excess stresses from being applied to the various components in the system. A smoothing action is necessary, for example, in electromechanical systems such as tape transports utilizing DC servos.

In a typical tape transport system, four different command signals may control forward and reverse, and slow and fast speed combinations. The magnitude and polarity of the DC command represents the desired speed and direction. The output of the command generator is generally used as the input to a servo system whose output drives a DC motor. An error signal is developed in accordance with the motor speed to cause the motor speed to track the input signal. Although the magnitude of the step command represents the desired final speed of the motor, it is apparent that the input signal to the servo system should not change instantaneously. If the input jumps suddenly, an abrupt change in the speed of the motor may cause such a large stress to be applied to the tape that the tape stretches beyond its elastic limit. For this reason, the output of the command generator should not change abruptly. Instead, it should change only gradually at a rate which controls the motor speed to build up at a fast enough but safe rate.

Prior art circuits which have been employed for this purpose have generally been complex in design. For example, when one considers that in a system having two directions and two speeds there are five possible DC command signals (stop, slow-forward, fast-forward, slow-reverse, fast-reverse), and that a transition must often be possible from any condition to any other condition (e.g., slow-forward to fast-reverse), it is apparent that the smoothing function circuitry can become exceedingly complex. To go from slow-forward to fast-reverse, for example, the smoothing function must necessarily be different from that required to go from slow-forward to stop.

It is a general object of my invention to provide a DC command generator of minimum complexity which is capable of generating many different smoothing functions.

Briefly, in accordance with the principles of my invention, DC input step commands (of either polarity depending upon the desired change in direction) are applied to one or both inputs of an operational amplifier. The output of the amplifier, the terminal at which the smoothed command function is generated, is connected back to one of the input terminals through a parallel combination of a resistor and a capacitor. In parallel with the resistor and capacitor is a pair of series-connected resistors, the junction of which is connectable through a switch to ground. Depending upon whether the switch is open or closed, the output signal rises to either of two levels at a respective rate.

As will be described in detail below, the additional series-connected resistors allow the feedback impedance to be changed selectively, and thus determine both the final output level and its rate of rise. The capacitor serves two functions. First, because the voltage across it cannot change instantaneously, it causes the output voltage to change gradually in response to a step input (the smoothing function). Second, the capacitor functions as a memory; the voltage across the capacitor represents the output signal (the present speed) at any time. The capacitor voltage is extended back to an input of the operational amplifier. The input to the operational amplifier is the sum of two signals, one representing the present motor speed and the other representing the desired speed. Because the capacitor voltage represents the instantaneous motor speed, whenever a new speed command is extended to the circuit the smoothing function, which is controlled by the capacitor voltage, is necessarily dependent upon the present speed. In this manner, the same smoothing circuit can be used no matter what kind of transition is required.

It is a feature of my invention, in the illustrative embodiments thereof, to provide an operational amplifier with a feedback circuit having parallel connected resistor and capacitor elements, with the resistor elements including at least two serially connected resistors the junction of which can be selectively connected to ground.

Further objects, features and advantages of my invention will become apparent upon consideration of the following detailed description in conjunction with the drawing, in which.

Figure 1:
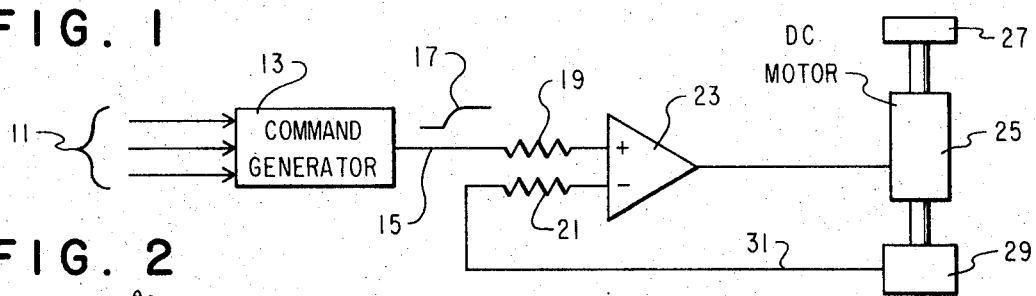
FIG. 1 depicts symbolically a typical servo controller having a DC command generator at its input.

Referring to FIG. 1, the output of difference amplifier 23 (which includes an amplifying stage) drives DC motor 25. A single output shaft of the motor drives both capstan 27 and tachometer 29. The capstan moves the magnetic tape in a tape system. The tachometer provides a signal on conductor 31 which is proportional to the motor speed.

The output of command generator 13 on conductor 15 is extended through resistor 19 to one input of the difference amplifier. The tachometer signal is extended through resistor 21 to the other input of the amplifier. This conventional feedback system results in a motor speed which is directly proportional to the level of the signal on conductor 15. DC command signals, as shown by the numeral 11, are applied to various inputs of command generator 13. The function of the command generator is to produce a DC signal on conductor 15 in accordance with the input command signals on conductors 11. The input command signals are typically step functions which are used to derive a DC potential on conductor 15 whose polarity and magnitude represents the desired direction and speed of the motor. However, while the inputs may be step functions, the signal developed on conductor 15 should rise only gradually as shown by waveform 17. An abrupt step applied to the input of operational amplifier 23 might cause the motor to accelerate so rapidly that an unsafe stress would be applied to some of the system components.

Figure 2:
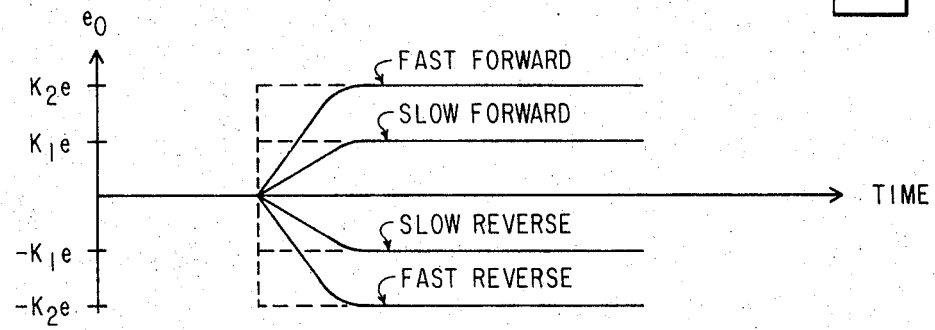
FIG. 2 depicts typical smoothing functions required of the command generator.

FIG. 2 shows typical desirable output signals from the command generator. The dotted waveforms depict the form of the step commands which would result in the absence of a smoothing function. The step commands can be of either polarity and, in the illustrative embodiment of the invention, of either of two magnitudes (one for a slow speed and the other for a fast speed). In the case of a "slow-forward" command input, the output $e_o$ of the command generator rises to a level of $k_1e$. For a "fast-forward" command, the output rises to the level of $k_2e$. For "slow-reverse" and "fast-reverse" commands, the output signals are smoothed in similar fashions but the final signal levels are negative.

When the motor is to stop, the output of the command generator should go to ground — also without an abrupt change. Although all four of the speed signals are shown in FIG. 2 as starting from an "at rest" position, it should be understood that generally a transition may be made from any speed to any other speed. For example, it is possible to go from slow reverse to fast forward. In such a case, the output signal must rise from $-k_1e$ to $k_2e$ with a rise time comparable to those shown in the drawing. One of the problems with prior art circuits is that several different smoothing circuits and/or extensive logic circuits have been required to control smooth transitions from any signal level to any other signal level.

Figure 3:
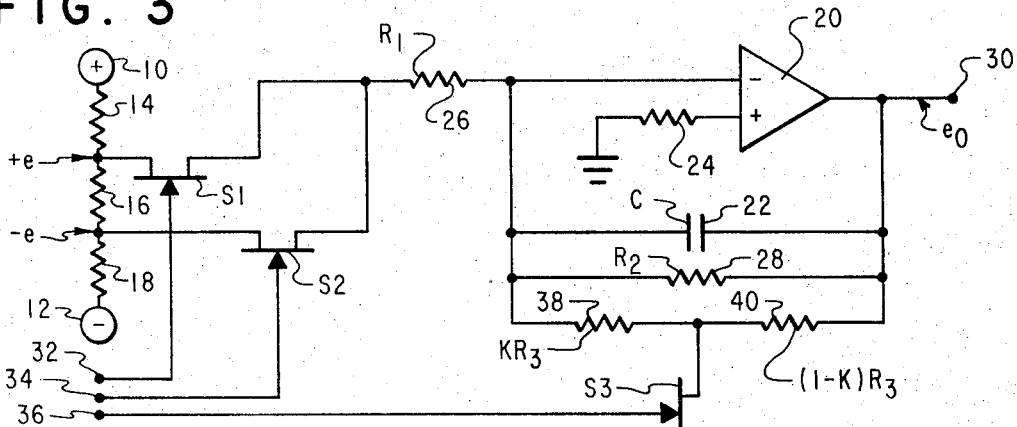
FIG. 3 depicts a first illustrative embodiment of the invention.

Referring to FIG. 3, resistors 14, 16 and 18 are connected in series between positive and negative supplies 10 and 12. A potential $+e$ is developed at the junction of resistors 14 and 16, and a potential $-e$ is developed at the junction of resistors 16 and 18. Each of the junctions is connected to the source of one of FET switches S1 and S2. The drains of the two transistors are connected together and to one end of resistor 26 which has a magnitude $R_1$. The other end of this resistor is connected to the minus input of operational amplifier 20. The gate of each of the FET switches is connected to a respective one of terminals 32 and 34. A positive potential at one of the two terminals causes the respective switch to turn on. The other (positive) input of the operational amplifier is connected to ground through resistor 24.

The output of the operational amplifier is connected to output terminal 30 at which output signal $e_o$, the smoothed command function, is formed. The output is also fed back through capacitor 22 and resistor 28 to the minus input of the operational amplifier. Resistor 28 has a magnitude $R_2$. In parallel with resistor 28 is a pair of series-connected resistors 38 and 40. The resistors in series have a total magnitude of $R_3$ ohms; resistor 38 has a magnitude $kR_3$ ohms and resistor 40 has a magnitude of $(1-k)R_3$ ohms, where $k$ is greater than 0 and less than 1. The junction of the two resistors is connected to the drain of FET switch S3, the source of which is grounded. The transistor is turned on when a positive potential is applied to control terminal 36.

The impedance seen looking out of the minus input of the operational amplifier consists of resistors 26, 28 and 38 in parallel (assuming that switch S3 is turned on and the junction of resistors 38 and 40 is grounded). Although a ground potential is applied to the plus input of the operational amplifier, in order that equal impedances be connected to both inputs, the impedance of resistor 24 is made equal to the effective impedance presented by three resistors of magnitudes $R_1$, $R_2$ and $kR_3$ connected in parallel. (When switch S3 is open, the third component of the total impedance is $R_3$ rather than $kR_3$. However, this makes little difference since $R_3$ is relatively large in the first place, and $k$ can be made close to 1.)

When switch S1 is closed, a DC step of magnitude $e$ is applied through resistor $R_1$ to the minus input of the operational amplifier. Assuming that switch S3 is closed, resistors 38 and 40 are connected through the switch to ground. This simply means that there is an additional resistor connected at the input and an additional resistor connected at the output of the amplifier, but that neither resistor affects the circuit operation especially if the two resistors are large enough in magnitude. For an input step of $+e$ and an initial output level of $e_{oi}$, the following equation describes the manner in which the output signal $e_o$ changes from the initial level:

$$e_o = e_{oi} - [(e(R_2/R_1) + e_{oi})](1 - \epsilon^{-t/\tau}), \tau = R_2C$$

At $t=0$, $e_o = e_{oi}$. After a sufficiently long time, when the term $\epsilon^{-t/\tau}$ is negligible compared to unity, $e_o = -e(R_2/R_1)$. The output falls with a time constant equal to $R_2C$.

Similarly, if switch S2 is closed rather than switch S1, then the signal level $-e$ is applied through resistor 26 to the minus input of the operational amplifier. In such a case, the output rises to the level $(R_2/R_1)(e)$ from any initial value.

On the other hand, suppose that switch S3 is opened, together with the closing of one of switches S1 or S2. In such a case, the junction of resistors 38 and 40 is no longer connected to ground. Instead, a total resistance of magnitude $R_3$ is connected in the feedback path in parallel with resistor $R_2$. In the equation defining the circuit operation, the magnitude $R_2$ must be replaced by the magnitude of the parallel impedances $R_2$ and $R_3$. Thus, the output signal rises or falls to a lesser magnitude of $(\pm e)(1/R_1)(R_3R_2/(R_3+R_2))$ with a time constant of $(R_3R_2/(R_3+R_2))c$. With switch S3 open, the output rises or falls to the slow forward or slow reverse level of FIG. 2, while with switch S3 closed the output rises or falls to the fast forward or fast reverse level.

It is the opening or closing of switch S3, together with the closing of only one of switches S1 or S2, that gives rise to the four different output levels of FIG. 2. In the event the motor is running and it is desired to stop it, all that is required is to close both of switches S1 and S2 together. In such a case, the junctions of resistors 14 and 16, and resistors 16 and 18, are connected together through the two switches and consequently, assuming equal magnitudes for resistors 14 and 18 and equal magnitude potential sources, a ground signal is applied to the minus input of the operational amplifier. The equation defining the system operation given above still applies, except that the value $e$ is now 0. Siwtch S3 should be left open or closed as it was following the previous command so that the rate of output signal change is the same as it was when the previous command was given. After the output goes to ground and the motor stops, switch S3 should be opened so that the effective feedback impedance is less than it is when the switch is closed; this stabilizes the output at the ground level.

The single capacitor in the circuit functions in two capacities — it is the smoothing element and it is also a form of memory. The minus input of the operational amplifier is a virtual ground and consequently the voltage across the capacitor is a measure of the output. Since the effective input to the operational amplifier is the sum of the level provided by one or both of switches S1 and S2, and the voltage across the capacitor, whenever a new DC command is provided to the amplifier, the actual input is a function of both the new command and the instantaneous (present) output. And since the voltage across the capacitor cannot change instantaneously, the instantaneous input is dependent only upon the present output. Consequently, the output signal rises or falls, in a smoothed fashion as determined by the capacitor, from an initial value which is the present value of the output. There are no instantaneous jumps; the output always rises or falls from a level proportional to the present speed of the motor controlled by the output signal. The use of a single capacitor, even though different effective feedback impedances can be inserted in the circuit, insures that the initial charge on the capacitor always corresponds to the present speed of the motor. It is the use of split resistor $R_3$ which permits the same capacitor to be used with different feedback impedances. Simply by grounding the junction of resistors 38 and 40, resistor $R_3$ can be effectively removed from the circuit to provide a larger magnitude feedback impedance.

It should be noted that many different speed functions can be controlled in accordance with the principles of my invention. For example, suppose that additional split resistors are connected across capacitor 22, each having a connection to ground through a switch such as S3. In such a case, if all of the switches are closed, the net effect is that all of the additional resistors can be ignored insofar as the circuit operation is concerned. However, if any one of the switches is opened, then the respective split resistor must be considered and the total feedback impedance is the parallel combination of resistor 28 and this resistance. By providing different magnitude split resistors, many different feedback impedances can be obtained. But no matter how the effective feedback impedance is changed, the same operational amplifier circuit can be used to control the output function because the capacitor voltage is always proportional to the present speed of the motor; it is always correctly initialized no matter what step functions are applied to the command generator.

It should be noted that although FET switches are shown in FIG. 3, it is possible to use diode bridges or any other comparable switches (e.g., relay circuits) to control the switching in and out of the feedback resistors and to control the polarity of the input signal.

Figure 4:
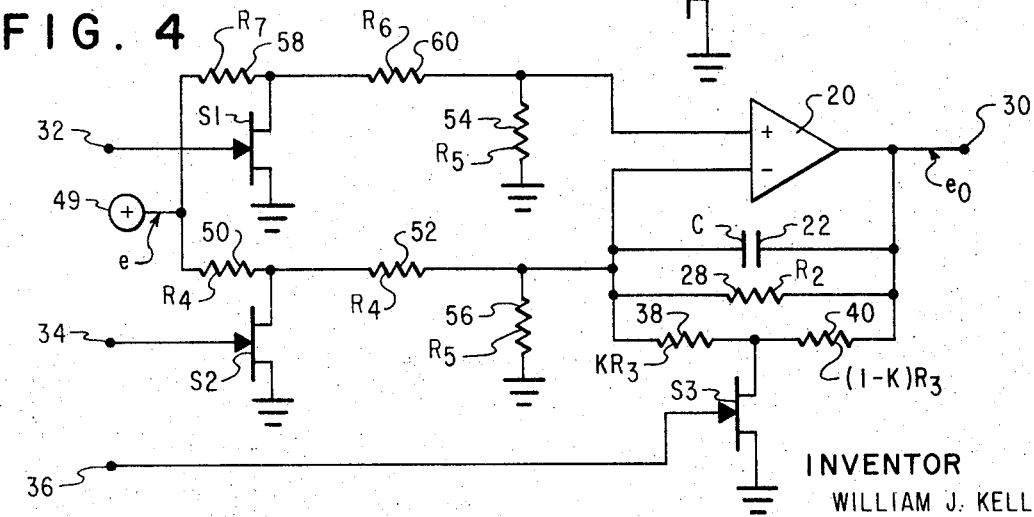
FIG. 4 depicts a second illustrative embodiment of the invention.

The circuit of FIG. 4 is similar to that of FIG. 3 except that there is now only one source 49 of a command potential of magnitude $e$, switches S1 and S2 determining whether the command potential is applied to the plus or minus input of the operational amplifier. A resistor 54 or 56 of magnitude $R_5$ is connected between each of the inputs and ground. The minus input of the amplifier is connected through two resistors 50 and 52 to source 49, with the junction of the equal-magnitude ($R_4$) resistors being connected through switch S2 to ground. The plus input of the operational amplifier is similarly connected through two resistors 58 and 60 to source 49, the junction of the two resistors being connected through switch S1 to ground.

Depending on which of switches S1 and S2 is closed, different signals are applied to the plus and minus inputs of the operational amplifier. This controls equal but opposite potentials to be generated at the output of the operational amplifier. If perfect switches are employed, one of the junctions of resistors 58 and 60, and 50 and 52 can be considered to be grounded while the other can be considered to be completely isolated from ground. As a practical matter, a perfect ground cannot be made. For this reason, when one of the switches closes, it can be assumed that a small potential source is connected between the "grounded" junction and ground. This potential source can be considered to have a magnitude of $e'$. Assuming that resistors 54 and 56 are equal in magnitude, the values of resistors 58 and 60 can be determined so that equal magnitude but opposite polarity signals are generated at terminal 30 depending upon which of switches S1 and S2 is closed.

Suppose that switch S2 is left open and switch S1 is closed along with switch S3. With switch S1 closed, a potential source of magnitude $e'$ may be considered to be connected to the junction of resistors 58 and 60. The equation for the output signal level (after capacitor C has fully charged) in as follows, where the term $e_{o1}$ is the steady-state value of the output signal at terminal 30 when switch S1 is closed:

$$e_{o1} = -e(R_2/2R_4) + e'[(R_5/R_5+R_6)](R_2)[((R_5+2R_4)/R_5(2R_4)]$$

The output potential is derived by utilizing the principle of superposition, that is, by considering the effect on the output of each of the two input sources while the other is treated as a short to ground, and then adding the two effects. With respect to source 49 of magnitude $e$, it has no effect on the plug input of the operational amplifier since any signal extended through resistor 58 is shorted through switch S1 to ground. However, source 49 does cause a potential to be applied to the minus input of the amplifier. Resistor 56, connected to the minus input, can be ignored; although this resistor tends to cause a lower voltage level to be applied to the minus input, the resistor affects the feedback in a converse manner such that the ratio of the feedback impedance ($R_2$) to the impedance connected in series with the minus input ($2R_4$) represents the gain of the amplifier with the polarity of the output signal being inverted independent of the value of $R_5$. Thus, the effect of source 49 is to produce a potential component at the output terminal of $-e(R_2/2R_4)$.

With respect to the signal $e'$ extended to the plus input of the operational amplifier, resistor 54 cannot be ignored. The resistor tends to decrease the signal level applied to the plus input of the amplifier without having a converse effect on the feedback. Since signal source $e'$ (switch S1) is applied to the plus input of the amplifier through resistors 60 and 54, by the voltage divider action the effective input is $e'(R_5/(R_5+R_6))$. The gain of an operational amplifier with respect to a signal applied to its plus input is the ratio of the feedback impedance ($R_2$) to the effective impedance presented by all elements connected to the minus input of the amplifier except the feedback resistor. With switch S2 open, the impedance seen looking out of the minus input terminal is resistor 56 in parallel with resistors 50 and 52 connected in series. Consequently, the $e'$ signal source contributes a component to the output potential as represented by the second term in the equation for $e_{o1}$.

Consider now the case where switch S2 is closed together with switch S3 and switch S1 is open. The output potential $e_{o2}$ is represented by the following equation:

$$e_{o2} = e\,[(R_5/(R_5+R_6+R_7))]\,(R_2)[((R_4+R_5)/R_4R_5)] - e'\,(R_2/R)$$

With respect to source 49, it does not extend a voltage component to the minus input of the amplifier since switch S2 provides a short to ground. However, the signal is extended to the plug input of the amplifier. Again, resistor 54 must be considered in determining the actual value of the input to the amplifier as a result of its voltage divider relation with resistors 58 and 60. The magnitude of the signal applied to the plus input is $e(R5/(R_5{}^R{}_6+R7))$. The gain of the amplifier is the ratio of the feedback impedance ($R_2$) to the impedance seen looking out of the minus input of the amplifier (excluding the feedback impedance). With switch S2 closed, this impedance is the parallel combination of resistors 52 and 56. Thus, source 49 contributes a component to the output potential as shown by the first term in the equation for $e_{o2}$. As for the component contributed by switch S2, since it is coupled to the minus input of the amplifier, the gain of the amplifier with respect to this input is simply $-(R_2/R_4)$.

Depending on which of switches S1 and S2 is closed, equal but opposite potentials are desired at the output terminal. To determine the magnitudes of resistors $R_6$ and $R_7$, assuming given magnitudes for impedances $R_4$ and $R_5$, it is necessary to equate $e_{o1}$ to $-e_{o2}$. This condition is satisfied if the respective coefficients of the terms $e$ and $e'$ in the two equations are equated. There results the following two equations:

$$R_2/2R_4 = [(R_5/(R_5+R_6+R_7))]\,(R_2)\,[((R_4+R_5)/R_4R_5)]$$

$$[(R_5/(R_5+R_6))]\,(R_2)\,[((R_5+2R_4)/R_5(2R_4))] = R_2/R_4$$

If these two equations are solved there results the following equations for the two impedance $R_6$ and $R_7$, both of which are independent of $R_2$:

$R_6 = R_4 - (R_5/2)$
$R_7 = R_4 + (3^R5/2)$

Because the two values are independent of $R_2$, equal but opposite polarity signals are derived at the output for both conditions of switch S3.

An error analysis, assuming slightly different values of $e'$ switches S1 and S2, shows that $e_{o1}$ and $e_{o2}$ differ in magnitude by no more than a few tenths of a percent for all practical circuits. The advantage of the circuit of FIG. 4 is that is not necessary to develop two precision voltages $+e$ and $-e$ as in the case of the circuit of FIG. 3. Although a feedback impedance of $R_2$ has been assumed in the analysis above, it is apparent that with a different feedback impedance if switch S3 is open, equal but opposite potentials at terminals 30 are still developed depending on which of switches S1 and S2 is closed. Furthermore, to get a zero output, all that is required is to close both of switches S1 and S2; because the magnitudes of the coefficients of both terms $e$ and $e'$ in the equations for $e_{o1}$ and $e_{o2}$ are equal, when both switches are closed the sum of $e_{o1}$ and $e_{o2}$ is zero.

Circuits designed in accordance with the principles of my invention provide accurate DC command signals with smoothed rise times; only a single integrator element is required for the smoothing function even though it is compatible with a large number of commands of either polarity. The circuits are thus of minimal complexity and yet provide complete command flexibility. Because the voltage across the capacitor is always representative of the servo output (e.g., speed of a motor), the command input can be changed at any time without encountering improper initial conditions on the integrator. Furthermore, the circuits provide a smoothing time constant which is matched to the magnitude of the command — the larger the desired output signal level, the larger the time constant.

Although the invention has been described with reference to particular embodiments, it is to be understood that these embodiments are merely illustrative of the application of the principles of the invention. For example, a switch in series with a feedback resistance could be used to effectively remove the resistance from the feedback circuit. Thus, it is to be understood that numerous modifications may be made in the illustrative embodiments of the invention and other arrangements may be devised without departing from the spirit and scope of the invention.

What I claim is:

1. A smoothing circuit comprising an operational amplifier having at least one input terminal and an output terminal, means for applying a step input to said at least one input terminal, capacitor means connected in a feedback configuration with said operational amplifier, and variable resistance means connected in parallel with said capacitor means, said variable resistance means includes at least one resistance means connected getween input and output terminals of said operational amplifier, and switch means operative to effectively prevent said at least one resistance means from performing a feedback function.

2. A smoothing circuit in accordance with claim 1 wherein said variable resistance means further includes a resistor of predetermined magnitude permanently connected between said input and output terminals.

3. A smoothing circuit in accordance with claim 2 wherein said step input applying means selectively applies a step function of either polarity to said at least one input terminal.

4. A smoothing circuit in accordance with claim 2 wherein said at least one resistance means includes a pair of series-connected resistors, said switch means being operative to selectively short the junction of said pair of resistors to ground.

5. A smoothing circuit in accordance with claim 4 wherein said step input applying means selectively applies a step function of either polarity to said at least one input terminal.

6. A smoothing ciruit in accordance with claim 2 wherein said operational amplifier has two input terminals, and said step input applying means includes a source of potential and gating means for selectively coupling said source of potential to a selected one of said input terminals and coupling the other of said input terminals to ground.

7. A smoothing circuit in accordance with claim 6 wherein said gating means is further operative to selectively couple both of said input terminals to ground to cause a ground potential to appear at said output terminal.

8. A smoothing circuit in accordance with claim 1 wherein said at least one resistance means includes a pair of series-connected resistors, said switch means being operative to selectively short the junction of said pair of resistors to ground.

9. A smoothing circuit in accordance with claim 1 wherein said step input applying means selectively applies a step function of either polarity to said at least one input terminal.

10. A smoothing circuit in accordance with claim 1 wherein said step input applying means includes two output terminals having opposite polarity potentials thereon and gating means for selectively coupling a selected one of said output terminals to said at least one input terminal to determine the polarity of the signal at said operational amplifier output terminal.

11. A smoothing circuit in accordance with claim 10 wherein said gating means is further operative to selectively couple both of said step input applying means output terminals to said at least one input terminal to cause a ground potential to appear at said operational amplifier output terminal.

12. A signal forming circuit comprising an amplifier having at least one input terminal and an output terminal, means for applying a command signal to said at least one input terminal, capacitor means connected in a feedback configuration with said amplifier, and variable resistance means connected in parallel with said capacitor means, said variable resistance means includes at least one resistance means connected between input and output terminals of said amplifier, and switch means operative to effectively prevent said at least one resistance means from performing a feedback function.

13. A signal forming circuit in accordance with claim 12 wherein said variable resistance means further includes a resistor of predetermined magnitude permanently connected between said input and output terminals.

14. A signal forming circuit in accordance with claim 12 wherein said at least one resistance means includes a pair of series-connected resistors, said switch means being operative to selectively short the junction of said pair of resistors to ground.

* * * * *